INVENTOR.
CLIFFORD K. FRIEND

Jan. 10, 1961 C. K. FRIEND 2,967,924
STABLE TEMPERATURE REFERENCE FOR INSTRUMENT USE
Filed June 12, 1958 2 Sheets-Sheet 2

INVENTOR.
CLIFFORD K. FRIEND
BY William F. O'Neil
AGENT

United States Patent Office 2,967,924
Patented Jan. 10, 1961

2,967,924

STABLE TEMPERATURE REFERENCE FOR INSTRUMENT USE

Clifford K. Friend, 18606 Citronia St., Northridge, Calif.

Filed June 12, 1958, Ser. No. 741,555

7 Claims. (Cl. 219—20)

The present invention relates to automatic temperature control and in particular to temperature stabilization of a thermocouple junction, piezo-electric crystal, or other relatively small element. The present invention was developed specifically for use in stabilizing the temperature of the reference (cold) junction of a thermocouple type pyrometer, or of any temperature control or sensing system using the thermocouple principle. Although developed for the above purpose, it will be clear to those skilled in the art that the invention is by no means limited to this particular application but could be advantageously employed wherever a small component of any instrumentation system is to be temperature controlled. In the prior art, various systems for temperature stabilization have been developed. The use of systems using thermocouples has become widespread, because they are rugged, comparatively simple, stable in calibration once properly calibrated and properly employed, and can operate over a considerable range of temperatures. The only requirement which must be met in order to insure accuracy and stability of the calibration of such a system is the requirement for stabilization of the "cold" junction. Every student of elementary physics is familiar with the laboratory method of stabilizing the temperature of the thermocouple "cold" junction by means of the ice water bath technique. This technique utilizes the principle that ice and water exist together only at 32° F. and not at any other temperature. It follows of course that the ambient temperature in which the ice bath resides must not fall below 32° F. long enough to freeze the entire solution, nor may the ambient be permitted to melt the ice completely. If it is desired to operate the ice bath in extreme ambient conditions, it is imperative that elaborate measures for insulating the bath be employed, or that the bath receive constant attention to replenish the ice often. Other disadvantages such as the cumbersome nature of the bath, its size and weight, and relative fragility will also be immediately apparent. Certain advanced applications of temperature measuring techniques as encountered in the aircraft and guided missile fields require that a thermocouple reference junction stabilization means be extremely rugged and resistant to high accelerations, shock, and vibration. In view of these requirements, the problem of temperature stabilization of the reference junction has been reviewed by various manufacturers and several have currently offered devices for stabilizing the reference junction at an elevated temperature. This expedient (sometimes referred to as a "hot" reference junction) makes possible successful operation in a high ambient temperature. This is an advantage, or even in some cases a necessity in order that the reference junction may be located at a point near the independent junction which is the active temperature measuring element in such a system. Concerning the drawings, it will be noted that four figures are used to illustrate the present invention.

Various systems have been devised for controlling a "hot" reference junction. Recognizing the value of the thermistor, several of the commercial devices currently available have incorporated thermistors as temperature checking devices. None have used thermistors as a part of the temperature control loop however. One type of temperature control relies on the familiar bi-metal strip with make and break contacts associated therewith. A more sophisticated arrangement currently being offered for use as a temperature controlled crystal oven uses the "change of state phenomenon" of a material having a melting point at the temperature desired and a relatively large latent heat of fusion such that a plateau of temperature versus heat flow in or out of the material is achieved on essentially the same physical principle as that relied upon in the use of the ice water bath. The sensory mechanism is based on the fact that the material changes volume on either side of the temperature plateau, and a carbon-pile is used to sense this volume change. Compared to the prior art bi-metal strip, the present invention affords the advantage of freedom from contact life problem, better shock and vibration characteristics in that no mechanically moving parts are involved, and the temperature point is electrically adjustable. The prior art "change of state" device although inherently an improvement over the bi-metal strip still has mechanically movable parts and consequently does not provide the ruggedness of the present invention. Moreover, the "change of state" is not adjustable in temperature and is inherently a more costly device to fabricate.

Figure 1:
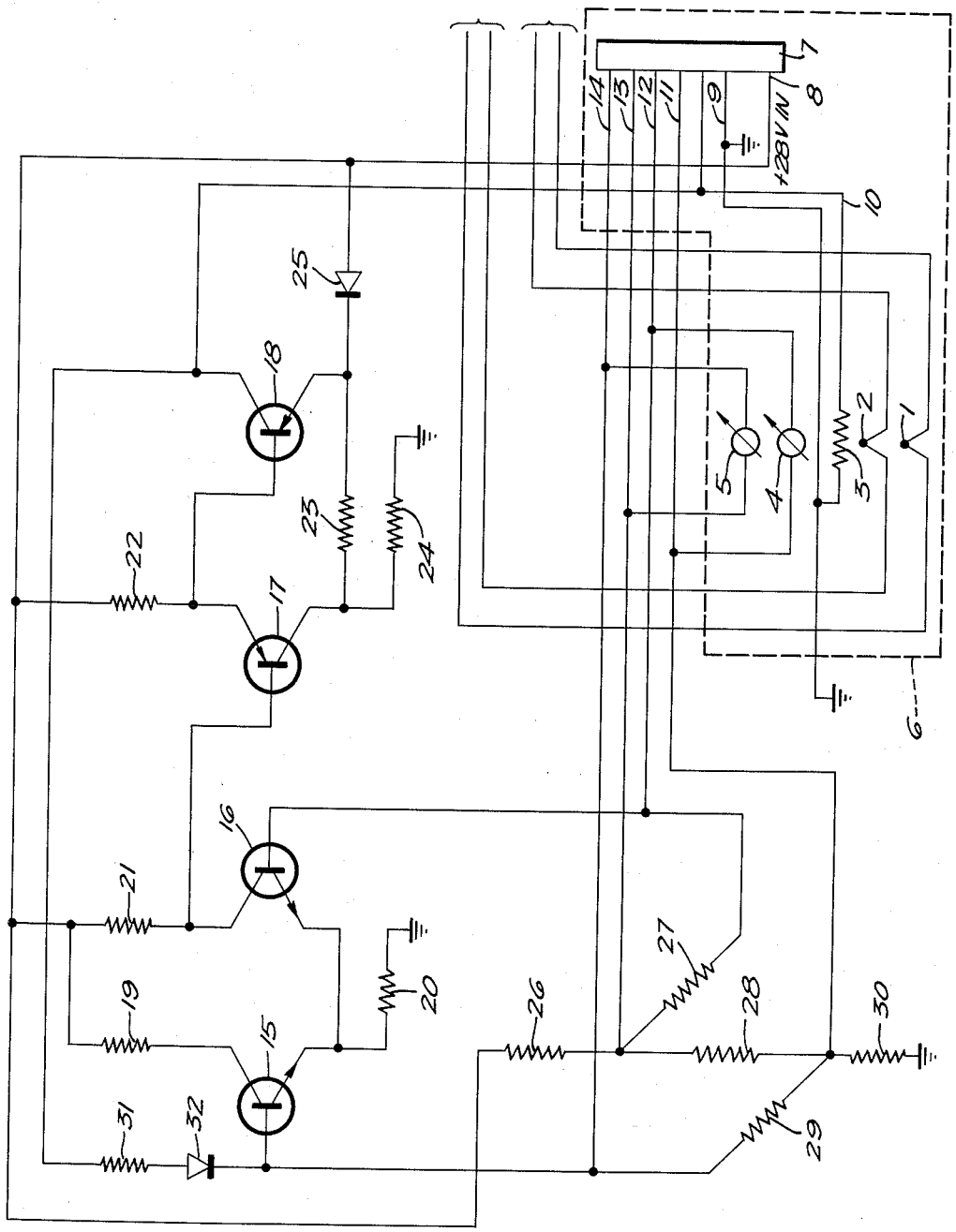
Figure 1 is a schematic of the circuit of the invention.

For the purpose of detailed description of the present invention, the drawings and operation thereof will be explained. Although the schematic of Figure 1 shows the use of transistors, it will be realized by those skilled in the art that vacuum tube amplificaiton also could readily have been employed. The transistor version is considered preferred, however, because of the long life and rugged physical characteristics of transistors. Other media of amplification such as the magnetic amplifier technique could also be used in place of the transistor circuit. Since the amplification function is relatively straightforward, the modification of the circuit to accommodate either vacuum tube or magnetic amplifier components could be worked out by anyone skilled in the art. In the event that a vacuum tube amplifier were used, high voltage anode supply would be required, whereas the relatively common 28 volt aircraft direct current voltage source is very satisfactory voltage supply for the transistor amplifier. If only an alternating current source were available, it is conceivable that a magnetic amplifier, which is also a relatively rugged device could be more convenient, since it would not require the use of rectification means.

Figure 3:
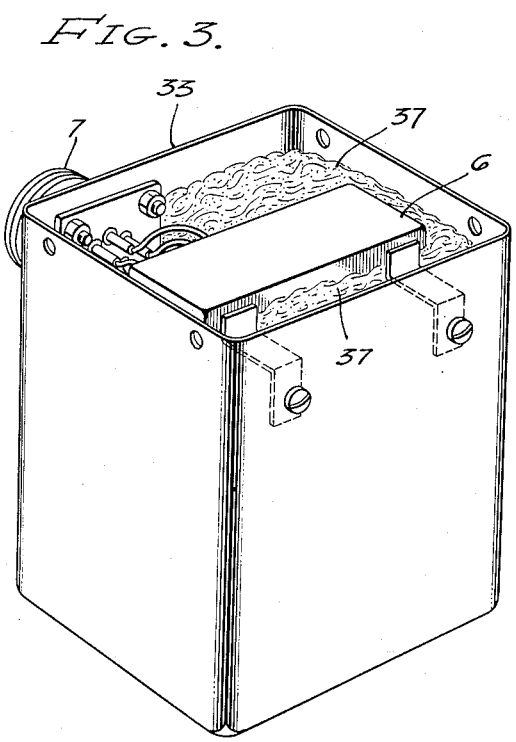
Figure 3 shows how that portion of the circuit including the heating resistor, thermistors, and independent elements may be insulated and packaged.
Figure 4:
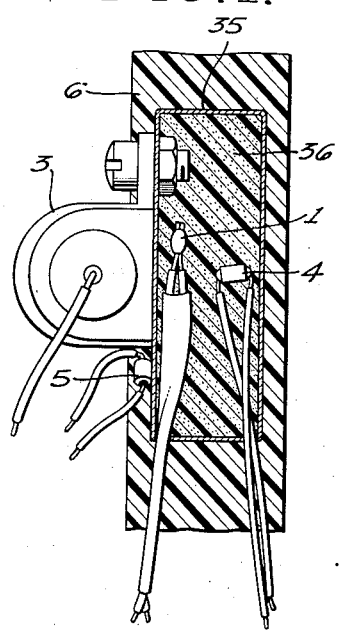
Figure 4 is a detailed cross-sectional view of the assembly containing the heating resistor, thermistors, and independent elements.

Figure 1 shows a pair of thermocouple junctions 1 and 2. Since as pointed out before, this invention could equally well be applied as a crystal oven or temperature stabilization device for some other form of instrumentation, the principles of operation of thermocouple junctions 1 and 2 are not a material part of the present invention. For the sake of general information however, junction 1 may be thought of as a Chromel versus copper junction and 2 may be thought of as an Alumel versus copper junction. The precautions and detailed considerations in connection with thermocouple instrumentation are omitted from this description; however, since as stated before, they do not form a part of the present invention. The inclusion of junctions 1 and 2, heating resistor 3, and thermistors 4 and 5 in a block 6 (which is also shown in Figures 3 and 4) will be discussed in detail as the description progresses. Transistors 15, 16, 17 and 18 constitute the gain elements of a relatively straightforward direct-coupled amplifier. It will be seen from Figure 1 that thermistors 4 and 5, together with resistors 27 and 29 form a bridge configuration with resistor 28 extending across points of said bridge, and with resistor 26 acting as a series supply voltage resistor to one point of said bridge. Resistor 30 completes the bridge voltage supply circuit to ground from an opposite point of the bridge. If it is assumed at the outset that the resistance values of thermistors 4 and 5 lie at a value which "balances" the bridge, any variance in thermistor resistance resulting from temperature change (since a thermistor is a specifically designed device which varies its resistance in accordance with temperature) will produce an unbalance in the bridge and consequently a signal therefrom.

Transistors 15 and 16 constitute a differential amplifier of a type, such that the base of each transistor affords a signal input. In this way the use of two thermistors can provide twice the signal per increment of temperature change as compared to the signal that the bridge could generate with one thermistor only as an active element.

It should be made clear at this point that the invention is entirely functional if only one thermistor were used and the other were replaced with a resistor of suitable value. The advantage of using two thermistors includes not only the double signal effect just discussed, but also a "lead" effect is achieved which gives improved temperature control as will be discussed later.

The functions of resistors 19, 20, 21 and 22 are well known in the transistor circuit theory. Transistor 18 is a power type capable of controlling a substantial current through heating resistor 3. The use of the bias diode 25 has become common in transistor circuitry in that it affords a degree of bias for transistors 17 and 18 which is relatively independent of the current flowing through it. Resistor 28 across the bridge circuit limits the voltage across the bridge when the thermistors are cold and have relatively high resistance. Initially, transistor 16 conducts since its base is most positive and transistor 15 remains out of conduction since its base is returned to the bottom of the bridge and its base voltage is influenced by the thermistor in the positive side of the bridge which has a very high initial resistance, for example, 10,000 ohms at 23 degrees centigrade for the thermistor used. Transistor 16 is direct-coupled to transistor 17, which in turn is Darlington connected to power transistor 18. Under the conditions described, transistor 18 is then conducting, and since it has a relatively low internal resistance during maximum conduction, it essentially acts as a switch connecting the positive 28 volt supply to the heating resistor 3.

The bias diode 25 exhibits a voltage drop of about one volt in the forward direction and this serves to bias transistor 17 as well as the power transistor 18. It may be pointed out at this time that diode 25 also affords a measure of damage protection to the circuit if the supply voltage polarity is accidentally reversed. This protection is afforded because the diode will not conduct any appreciable amount of current in the reverse direction.

Resistors 23 and 24 serve as a bleeder to insure that there is a bias present at the cathode of diode 25 and available to transistors 17 and 18 when power transistor 18 is not conducting thereby reducing the power dissipation of transistor 17. When the thermal assembly 6 reaches operating temperature, thermistors 4 and 5 reach resistance values equal to or slightly less than resistors 27 and 29. In this condition (at approximately 243 degrees Fahrenheit for the components and values used) transistor 15 becomes conductive and transistors 16, 17 and 18 become cut off. Only ½ degree of temperature fall is necessary to reverse this "flip-flop" action, thereby reverting to the initial condition and reapplying power to heating resistor 3. The effect of diode 32 and resistor 31, which are optional and have been thus far disregarded as if not present, is to prevent the discrete "flip-flop" action described and substitute a proportional control in which the entire circuit seeks an operating point in a manner not unlike a voltage regulated power supply. The current in the heating resistor 3 would tend to reach a value which would supply enough heat to balance out the heat losses from the thermal assembly 6.

Figure 2:
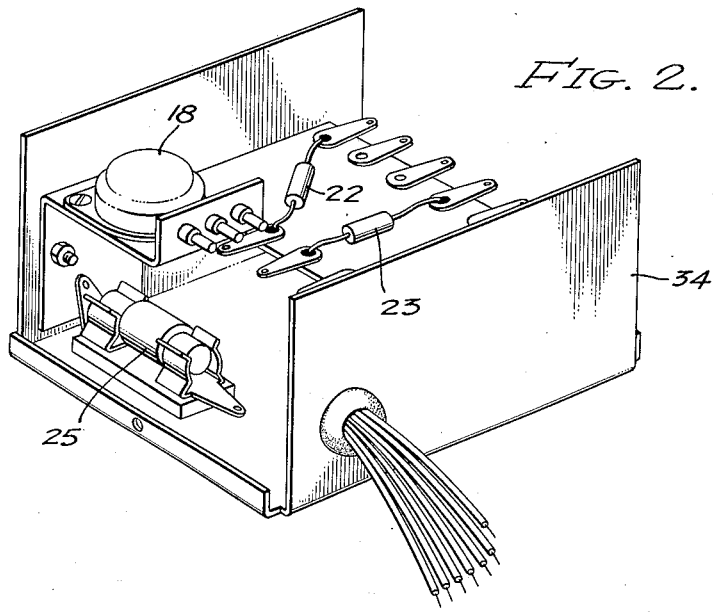
Figure 2 is a mechanical drawing showing how the bridge and amplifier portions of the circuit could be packaged.

As previously indicated, those components (i.e. 3, 4 and 5) which are packaged with the independent element can be packaged in a separate assembly as is shown at 6 in Figures 1, 3 and 4. In the physical configuration shown in Figures 2, 3 and 4, two separate packages were employed, mainly because the transistors used were germanium types having a lower permissible operating temperature than may be encountered at the location of the controlled junctions. It is, of course, true that silicon transistors could be used, making operation of a one package unit more feasible in higher ambient temperatures. The details of construction of the embodiment illustrated in Figures 2, 3 and 4 will now be discussed in some detail.

The mechanical chassis 34 contains all the electrical components except those in the thermal assembly 6. A "heat sink" mounting is shown for transistor 18 which would ensure that heat due to power dissipated in 18 would be dispersed adequately. The diode 25 is shown clip mounted as is standard for this component. For the purpose of illustration it was thought not necessary to show other than a few of the other components, since they would all be mounted on the same board as, and in similar manner to that shown for resistors 22 and 23. Wire leads from the chassis 34 would normally terminate in a connector which would mate with connector 7 on chassis 33. Referring to Figure 3, chassis 33 serves to house the thermal assembly 6 in a glass wool or some other heat insulating medium. Figure 4 shows a cross-sectional view of the thermal assembly 6 to illustrate details of construction. Junction 1 and thermistor 4 are shown imbedded in a relatively solid mass 36. This mass may be epoxy resin or some similar material with suspended metallic or metallic oxide powder distributed therein. Certain types of synthetic rubber or semi-rigid plastic materials could also be expected to serve the purpose, the object being to afford a rigid potting mass which will reach a relatively uniform temperature condition throughout. Enclosing this material 36 is a metallic shell 35 which, for best results, should be copper. Heating resistor 3 is then mechanically affixed to shell 35 and the heat from 3 is well distributed around 35 and through 36 without occurrence of "hot spots." Thermistor 5 is shown mounted on shell 35 near the heating resistor 3. In this location it can "feel" the heat from 3 more quickly than will thermistor 4. The change of resistance of 5 will then tend to "anticipate" any overshoot in the heating-cooling cycle and thereby minimize the effect of thermal inertia. This can properly be called a "lead" effect in accordance with servomechanism theory. It is separate and distinct from the lead effect introduced when optional diode 32 and resistor 31 are used.

The following table lists typical values and types of electrical components used in the embodiment shown. These values and types will be recognized by those skilled in the art.

Typical circuit components:

| | |
|---|---|
| Junction 1 | Copper vs. Chromel. |
| Junction 2 | Copper vs. Alumel. |
| Heating Resistor 3 | 50 ohms 10 watts, metal encased with flat mounting surface on one side. Such as manufactured by Dale-ohm Company, Kearney, Nebraska. |
| Thermistor 4 | Type 4d21 as manufactured by Veco (Victory Engineering Corporation) Union, New Jersey. |
| Thermistor 5 | Type 4d21 as manufactured by Veco (Victory Engineering Corporation) Union, New Jersey. |
| Transistor 15 | 2N78. |
| Transistor 16 | 2N78. |
| Transistor 17 | 2N43. |
| Transistor 18 | 2N353. |
| Resistor 19 | 1000 ohms. |
| Resistor 20 | 6800 ohms. |
| Resistor 21 | 1000 ohms. |
| Resistor 22 | 220 ohms. |
| Resistor 23 | 680 ohms. |
| Resistor 24 | 1000 ohms. |
| Resistor 26 | 470 ohms. |
| Resistor 27 | 346 ohms (precision wire wound with low temperature coefficient). |
| Resistor 28 | 1000 ohms. |
| Resistor 29 | 346 ohms (precision wire wound with low temperature coefficient). |
| Resistor 30 | 1500 ohms. |

It should be emphasized that neither the values and types shown, nor the specific configuration shown should be interpreted as limiting the scope of the present invention. It will be obvious to those skilled in the art that changes and modifications may be made which legitimately fall within the scope of the present invention. Accordingly, the attached claims are intended to set forth the novel aspects of the present invention.

What is claimed is:

1. A temperature stabilizing system for accurately controlling the temperature of an independent element comprising the combination of; at least one thermistor, thermally conductive imbedding means at least partially enclosing said independent element and said thermistor, a heating resistor and additional heat conducting means having heat conductivity greater than said imbedding means disposed between said heating resistor and said imbedding means and substantially enclosing said imbedding means for providing effective heat conduction and distribution and thereby forming an assembly, thermal insulation at least partially surrounding said assembly, and control means responsive to the value of resistance of said thermistor, said control means being direct coupled to, and adapted to energize and deenergize said heating resistor in response to direct coupled variations in the resistance value of said thermistor, thereby effecting temperature stabilization of said independent element.

2. A temperature stabilizing system for accurately controlling the temperature of an independent element comprising the combination of; a pair of temperature sensing devices of a type which vary an electrical characteristic as a predetermined function of temperature, thermally conductive imbedding means substantially enclosing said independent element and at least one of said temperature sensing devices, electric heating means thermally connected to said imbedding means, the other of said sensing devices being located farther from said independent element than said one of said temperature sensing devices and with respect to said heating means and said imbedding means so as to sense heat from said heating means before said heat is sensed by said one of said sensing devices, and control means responsive to changes in the said electrical characteristic of either of said temperature sensing devices to control energization of said heating means, thereby to effect temperature stabilization of said independent element.

3. A temperature stabilizing system for accurately controlling the temperature of an independent element comprising the combination of; first and second thermistors each for producing a change of electrical resistance as a function of temperature, thermally conductive imbedding means in a substantially solid state, said imbedding means substantially enclosing said independent element and said first thermistor disposed in close proximity with said independent element, electric heating means thermally connected to said imbedding means, said second thermistor being disposed at a point farther from said independent element than said first thermistor, said second thermistor moreover being located with respect to said heating means and said imbedding means so as to sense heat from said heating means prior to the sensing of said first thermistor, and control means adapted to control electrical energy to and therefore heat from said electrical heating means in response to a combination of the changes of electrical resistance of said first and second thermistors.

4. The invention defined in claim 3 in which the said control means includes a power transistor for controlling current flow in said heating means, at least one transistor for low level amplification prior to said power transistor, and feedback means consisting of a resistance and a diode in series disposed between the output of said power amplifier and the input to said transistor for low level amplification, thereby increasing the tendency of said control means to operate in a continuous control manner rather than in an on-off manner.

5. The invention set forth in claim 2 further defined in that said control means is responsive to said changes in the said electrical characteristics of both of said temperature sensing devices in combination.

6. The invention set forth in claim 2 further defined in that said electrical characteristic of said sensing devices which varies as a predetermined function of temperature is the electrical resistance of said sensing devices.

7. The invention set forth in claim 3 further defined in that said control means includes a bridge circuit in which are disposed said first and second thermistors in a manner such that the said changes of electrical resistance of said first and second thermistors are added together, thereby to cause said control means to control electrical energy to said heating means as a function of the sum of the said changes of electrical resistance of said first and second thermistors.

References Cited in the file of this patent

UNITED STATES PATENTS

| | | |
|---|---|---|
| 2,488,580 | Burleigh | Nov. 22, 1949 |
| 2,522,521 | Kock | Sept. 19, 1950 |
| 2,524,886 | Colander | Oct. 10, 1950 |
| 2,666,889 | Ehret et al. | Jan. 19, 1954 |
| 2,685,627 | Ehret et al. | Aug. 3, 1954 |
| 2,759,089 | Ellis | Aug. 14, 1956 |
| 2,761,916 | Barton | Sept. 4, 1956 |
| 2,870,310 | Van Overbeek | Jan. 20, 1959 |
| 2,872,556 | Obermaier | Feb. 3, 1959 |
| 2,898,434 | Lemmerman et al. | Aug. 4, 1959 |